US006298234B1

(12) United States Patent
Brunner

(10) Patent No.: US 6,298,234 B1
(45) Date of Patent: Oct. 2, 2001

(54) SYSTEM AND METHOD FOR PROVIDING ACCESS TO THE INTERNET VIA A RADIO TELECOMMUNICATIONS NETWORK

(75) Inventor: Robert F. Brunner, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/314,231

(22) Filed: May 18, 1999

(51) Int. Cl.⁷ .................................................. H04Q 7/20
(52) U.S. Cl. ........................ 455/432; 455/433; 370/400
(58) Field of Search .................................. 455/432, 433, 455/434, 435, 440, 445, 450, 452, 456; 370/328, 329, 331, 332, 333, 338, 352, 353, 400; 709/227, 228

(56) References Cited

U.S. PATENT DOCUMENTS

| 5,590,133 | * | 12/1996 | Billstrom et al. ..................... 370/349 |
| 6,058,422 | * | 5/2000 | Ayanoglu et al. .................... 709/226 |
| 6,137,791 | * | 10/2000 | Frid et al. ............................. 370/352 |
| 6,151,628 | * | 11/2000 | Xu et al. ............................... 709/225 |
| 6,181,935 | * | 1/2001 | Grossman et al. ................... 455/433 |
| 6,185,204 | * | 2/2001 | Voit ..................................... 370/352 |

FOREIGN PATENT DOCUMENTS

WO 99/16263   4/1999  (WO) .

OTHER PUBLICATIONS

Tamara Žvela, HPT, Croatian Post and Telecommunication; "Global Internet Roaming"; 1998; pp. 95–103.

Jari Hämäläinen and Timo Jokiaho; "GSM Access to Internet"; Mar. 1994; pp. 37–42.

* cited by examiner

Primary Examiner—Dwayne Bost
Assistant Examiner—Jean A Gelin
(74) Attorney, Agent, or Firm—Smith, Danamraj & Youst P.C.

(57) ABSTRACT

A system and method of providing Internet access to a roaming mobile subscriber located in a visited service area served by a serving MSC of a radio telecommunications network. The radio telecommunications network includes a home service node which comprises a Home Location Register (HLR) and a Service Control Point (SCP). The home service node stores a subscriber service category associated with the mobile subscriber for identifying an Internet Service Provider preferred by the mobile subscriber. An ISP database associated with the identified ISP is coupled to the home service node. When the roaming mobile subscriber initiates an Internet access service while located in the visited service area, the serving MSC sends a message to the home service node in response thereto. Preferably, the message includes a service trigger for the mobile subscriber, a plurality of digits generated pursuant to initiating the Internet access service, and a location information portion relating to the mobile subscriber's location and the location of the serving MSC. A switch identity may also be provided therewith. Based on the contents of the message, the home service node determines the identity of the preferred ISP and interrogates the ISP database to determine a routing number for an ISP server location that is most proximately local with respect to the location of the mobile subscriber or the serving MSC. When the routing number is returned to to the serving MSC, it establishes a trunk connection to the ISP server location for providing Internet acces.

16 Claims, 4 Drawing Sheets

SYSTEM AND METHOD FOR PROVIDING ACCESS TO THE INTERNET VIA A RADIO TELECOMMUNICATIONS NETWORK

BACKGROUND OF THE INVENTION

1. Technical Field of the Invention

The present invention relates to telecommunication systems and, more particularly, to a system and method for providing access to the Internet via a radio telecommunications network for a mobile subscriber while roaming in a visited service area.

2. Description of Related Art

Due to the phenomenal growth of the popularity of the Internet as the world's largest public data network, providing on-demand access to it has become a significant concern. Entities such as Internet Service Providers (ISPs) have become prominent in providing inexpensive access to the Internet via conventional wireline Public Switched Telephone Networks (PSTNs). Traditionally, such Internet access has been confined to connecting subscribers' home or office computers to an ISP server that is located in a geographic region that is typically near their homes or offices.

Recently, because of the growth of the ISPs in terms of their geographic coverage, subscribers who are away from their homes or offices have also been able to access the Internet. Typically, obtaining this "remote site" access involves calling a 1-800 number to connect to the computer user's ISP. At times, it may be necessary to call the ISP's sales department or customer service department to request a telephone number associated with a server location ("local" server) of that ISP which is located nearest to the subscriber's present location. Once the "local" server's telephone number is obtained, the subscriber's computer may then be connected thereto for accessing the Internet. It should be appreciated, therefore, that it is typically quite inconvenient for users to access the Internet while located away from their homes/offices.

Current improvements in computer and radio telecommunications technologies have now made it feasible to access the Internet using computers interfaced with mobile phones. Because of this development, Internet access is available even in areas without any landline connections. However, when mobile subscribers attempt to access the Internet while roaming, they experience inconvenient situations similar to those encountered by the wireline users described above. Moreover, if the "local" ISP server is located in a calling area that is different from where the roaming mobile subscriber is located, the mobile subscriber may typically incur additional tolls and charges in relation to its wireless Internet access.

A current solution for providing Internet access to roaming mobile subscribers involves incorporating or interfacing a device known as a Direct Access Unit (DAU) with a Mobile Switching Center (MSC) that serves the visiting mobile subscriber. The DAU device routes an Internet access call (data call) originated by the visiting mobile subscriber to an ISP server location determined by the MSC operator. There are several shortcomings in this approach. First, the interfacing devices are typically operable only with digital mobile phones, thereby precluding the use of widely used analog or dual-mode mobile phones for accessing the Internet. Second, the ISP server location to which the roaming mobile subscriber's data call is routed is controlled by the operator of the serving MSC, thereby precluding the mobile subscriber from selecting a preferred ISP server location. Also, the routing path to the ISP server location may not be the most economical call path available to the mobile subscriber. Further, if the operator-controlled ISP location is in a different calling area, the mobile subscriber's Internet access is subject to additional charges as well.

Accordingly, based upon the foregoing discussion, it should be readily appreciated that there exists a need for a solution which overcomes the deficiencies and shortcomings of current technologies and advantageously provides Internet access to roaming mobile subscribers in a radio telecommunications network. The present invention provides such a method and system.

SUMMARY OF THE INVENTION

In one aspect, the present invention is directed to a method of providing Internet access to a roaming mobile subscriber operating a mobile station in a visited service area served by a serving Mobile Switching Center (MSC). The serving MSC is disposed in a radio telecommunications network system which includes a home service node having a Home Location Register (HLR) and a Service Control Point (SCP). In accordance with the method of the present invention, the home service node stores a subscriber service category associated with the mobile station for identifying an Internet Service Provider (ISP). At least one routing number for the identified ISP is stored in an ISP database. When the roaming mobile station initiates an Internet access service while located in the visited service area, the serving MSC determines that the mobile station has initiated the Internet access service and sends a message to the home service node in response. The message includes a service trigger for the mobile subscriber, a plurality of digits dialed or effectuated by the mobile subscriber, and a location information portion relating to the location of the mobile subscriber and the serving MSC's location.

Upon receiving the message, the home service node determines the identity of the ISP for the mobile station based on the contents of the message. Thereafter, it interrogates the ISP database associated with the identified ISP to determine a routing number for an ISP server location that is local to the location of the mobile subscriber. In response, an appropriate routing number is returned to the serving MSC for establishing a trunk connection to the ISP server location.

In a further aspect, the present invention is directed to an Internet access system disposed in a radio telecommunications network, for providing Internet access to a roaming mobile subscriber located in a visited service area served by a serving Mobile Switching Center (MSC). The Internet access system comprises access means, available to the roaming mobile subscriber, for initiating an Internet access service. Also included in the network system is a home service node which comprises a Home Location Register (HLR) and an associated Service Control Point (SCP). The HLR includes a subscriber service category for identifying an Internet Service Provider (ISP) preferred by the roaming mobile subscriber. An ISP database is coupled to the home service node via a standard or proprietary interface. When the serving MSC sends a message to the home service node responsive to an actuation of the access means by the roaming mobile subscriber, the home service node determines the identity of the preferred ISP based on the message and interrogates the ISP database for a routing number associated with an ISP server. Based on the location of the mobile subscriber and/or the serving MSC's location, a routing number associated with an ISP server location that is most proximately local to the mobile subscriber's location and/or the serving MSC's location is returned. The serving MSC of the radio telecommunications network then establishes a trunk connection to the ISP location associated with the returned routing number.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
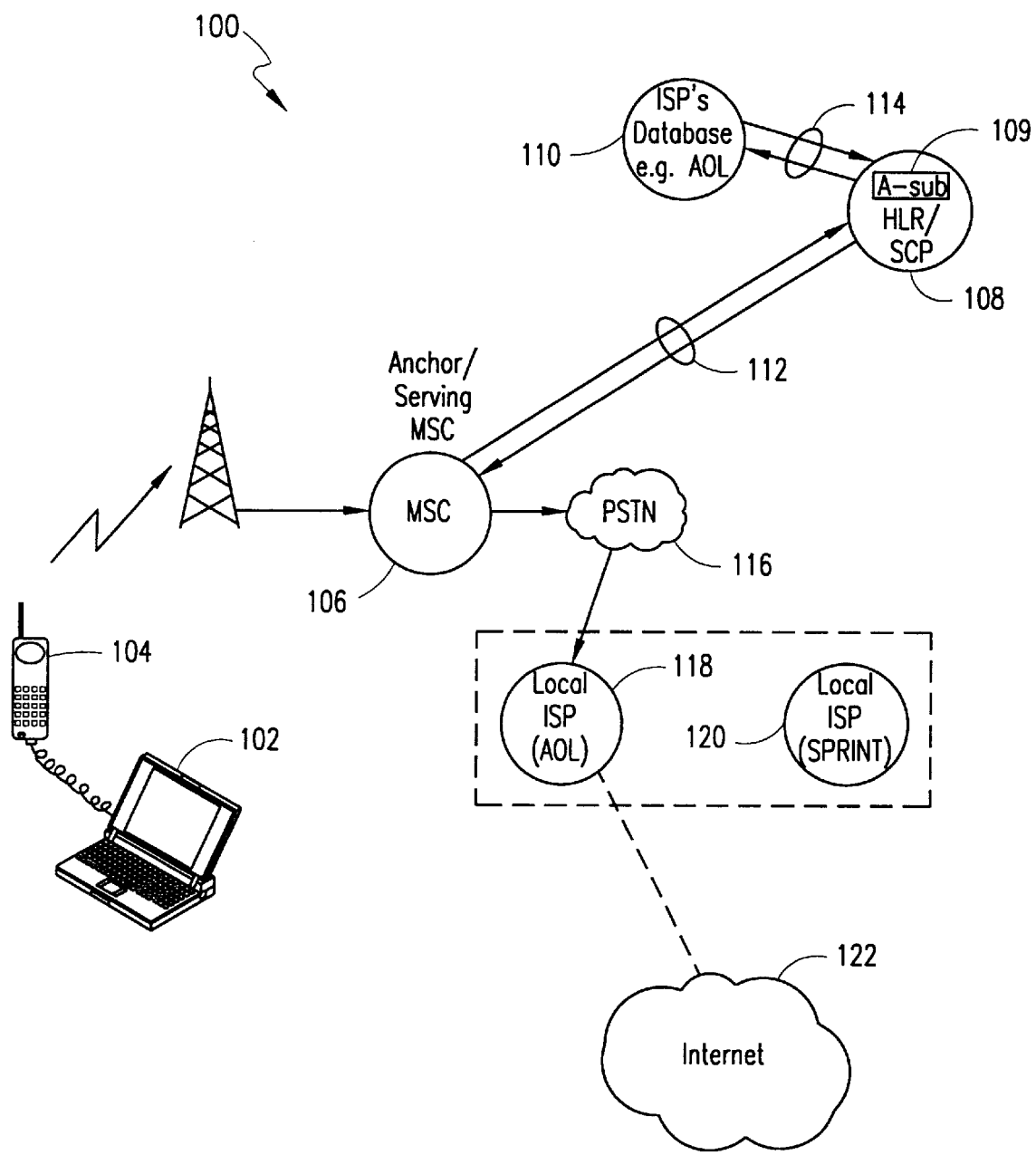
FIG. 1 depicts a radio telecommunications network provided in accordance with the teachings of the present invention for furnishing Internet access to a visiting mobile subscriber.

In the drawings, like or similar elements are designated with identical reference numerals throughout the several views, and the various elements depicted are not necessarily drawn to scale. Referring now to FIG. 1, depicted therein is a radio telecommunications network 100 provided in accordance with the teachings of the present invention for furnishing Internet access to a visiting mobile subscriber (not shown) equipped with a computer 102 and a suitable mobile phone 104. The network 100 preferably comprises a Home Location Register (HLR) co-located with a Service Control Point (SCP) at a home service node 108 that services the mobile subscriber. In some alternative embodiments, however, the HLR and the SCP may be provided as separate entities. In either case, the home service node 108 preferably includes a subscriber database 109 for storing service category information pertaining to the mobile subscriber.

A serving Mobile Switching Center (MSC) 106 is included in the radio telecommunications network 100 for servicing the mobile subscriber when the subscriber roams into the MSC's service area. The serving MSC 106 communicates with the home service node 108, preferably via an ANSI-41 pathway 112 for effectuating registration/ authentication, system accesses, and for obtaining necessary subscriber information, et cetera, in order to serve the mobile subscriber appropriately.

In accordance with the teachings of the present invention, a new subscriber service, which may be designated as a Roaming Internet Access (RIA) service, is provided as a call originating service (A-number service or AIN service) to which the mobile subscriber (A-subscriber) subscribes. Originating services are defined as services that have an AIN trigger and are invoked by a call originated by the A-subscriber. The services are triggered by recognition of the calling party's telephone number (A-number). Generally, when a service is invoked, the HLR checks the service category and the profile information stored in the subscriber database 109, and queries the SCP of the home service node 108 to execute a suitable service script with respect to the invoked service.

Continuing to refer to FIG. 1, a communication pathway 114 is provided between the home service node 108 and a database associated with an Internet Service Provider (ISP), hereinafter referred to as the ISP database 110. It should be understood that while the ISP database 110 is provided as a separate entity, it may be co-located or integrated with the home service node 108. Furthermore, the communication pathway 114 between the ISP database 110 and the home service node 108 may be effectuated by using either proprietary or standard protocol interfaces. The ISP database 110 preferably contains a list of routing numbers associated with a plurality of ISP server locations that belong to the ISP's domain. In some implementations, the ISP database 110 may also contain routing numbers of ISP server locations belonging to different domains with which the ISP database operator may have cross-domain service agreements. Accordingly, the ISP database 110 may also be referred to as an ISP routing number database.

In accordance with the teachings of the present invention, when the roaming mobile subscriber invokes the RIA service by utilizing the combination of the computer 102 and mobile phone 104, the serving MSC 106 analyzes the digits transmitted thereto and queries the home service node 108 to determine an appropriate routing number. The home service node 108, in turn, interrogates the ISP database 110 for a routing number associated with an ISP server location that is preferably located within the serving area of the serving MSC 106 so that a "local" data call (that is, a non-toll call) can be made thereto for accessing the Internet. Accordingly, in some implementations, the ISP database 110 may include an algorithm to determine the location of an ISP server that is closest to the roaming mobile subscriber relative to the location of the serving MSC 106. This ISP server location routing number is passed back to the serving MSC 106 which then completes the Internet access data call to the "local" ISP server location 118 via, for example, the Public Switched Telephone Network (PSTN) 116.

While one or more local ISP locations may be available (for example, local ISP 118 and local ISP 120 are shown herein), the service category information associated with the mobile subscriber may preferably include an indication as to the mobile subscriber's preferred ISP on the basis of the digits transmitted pursuant to service invocation. In some embodiments, where the subscriber's ISP supports multiple local ISP servers, an arbitration algorithm may be provided in order to determine a unique routing number.

Preferably, the preferred ISP is one with which the mobile subscriber has already established an Internet access account. Once the data call trunk is established to the local ISP (for example, local ISP location 118), the mobile subscriber may be presented with an access authentication dialog on its computer 102 so that it may authenticate itself and be "on the Internet." Via the Internet 122, the mobile subscriber can access its home or office web sites, receive or send electronic mail, or engage in a host of Internet-related activities.

Figure 2:
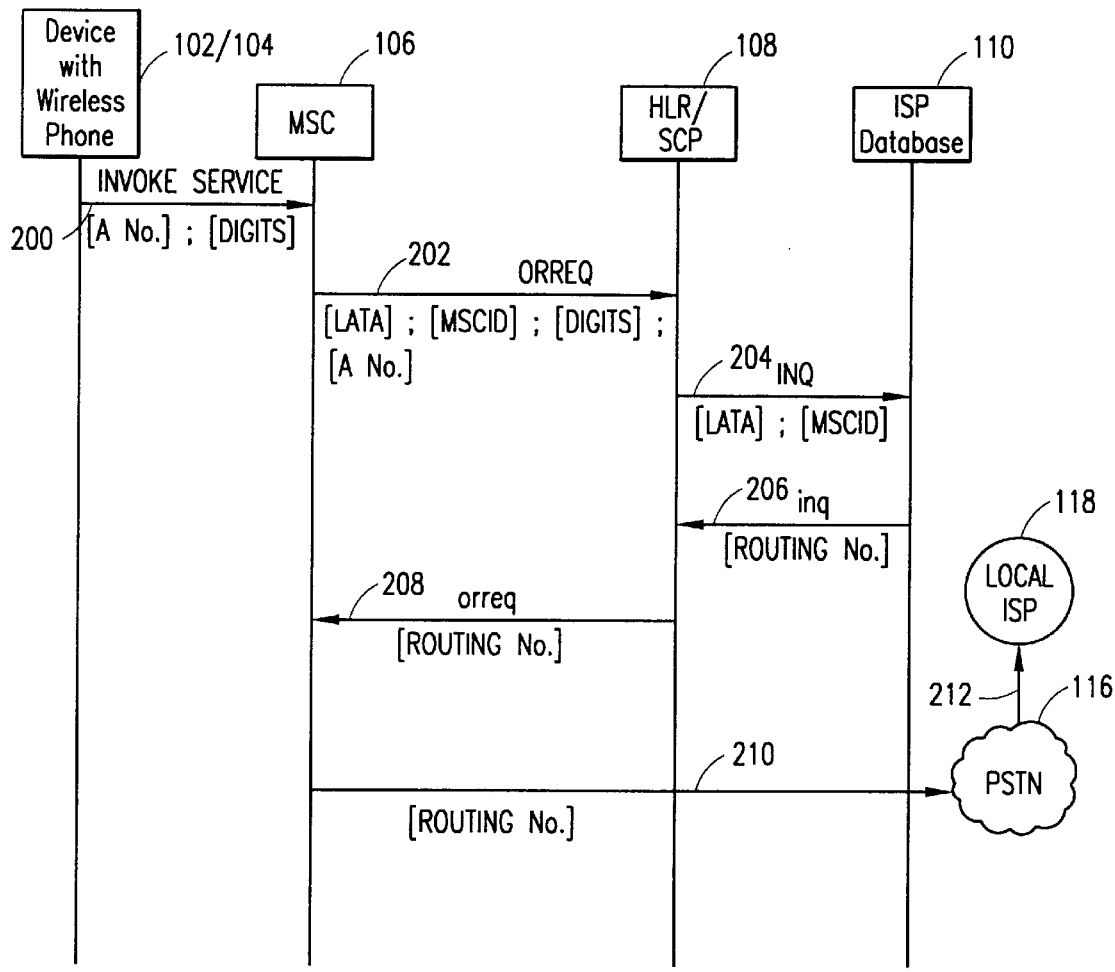
FIG. 2 is a message flow pathway illustrating an exemplary flow of messages between the nodes of the network of FIG. 1 when implementing the method of the present invention.

FIG. 2 is a message flow pathway illustrating an exemplary flow of messages between the nodes of the network of FIG. 1 for effectuating the RIA service described hereinabove. For the sake of brevity, the control message flow pathway will be described hereinbelow in conjunction with the flow diagram of an exemplary method of providing Internet access to a visiting or roaming subscriber, depicted in FIGS. 3A and 3B. Accordingly, reference numerals labeling the various steps of the flow diagram pertain to these FIGS.

When the RIA service is invoked by the mobile subscriber (step 302) using the computer device/wireless phone 102/

104 (for example, by entering an alphanumeric string, such as, "*INTERNET"), the A-number and the Dual Tone Multi Frequency (DTMF)-coded digits (translated from the alphanumeric string) are provided to the serving MSC 106. This signal flow is represented by the flow path 200. Upon receiving the digits and the A-number, the serving MSC 106 analyzes the received information and determines that an AIN service is invoked by the mobile subscriber (step 304) and transmits preferably an ANSI-41 ORIGINATION REQUEST (ORREQ) message 202 to the home service node 108 (step 306). The ORREQ message 202 preferably includes a suitable location parameter or parameters such as a Local Access and Transport Area (LATA) code (calling area code associated with the location of the computer device/wireless phone 102/104 and/or of the serving MSC), MSCID (the switch ID (SWID) of the serving MSC), digits dialed, and the subscriber's A-number as parameters. It should be readily apparent that when the serving MSC serves more than one LATA, the serving MSC's location may be different from that of the computer device/wireless phone. Based on the received digits information, the HLR queries the subscriber's service profile database 109 to determine the identity of the subscriber's preferred ISP (step 308). The home service node 108 then interrogates or queries the ISP database 110 associated with the identified preferred ISP for an appropriate routing number (step 310). This interrogation/inquiry (INQ) path 204, which may be effectuated via either a standardized or proprietary protocol interface, preferably includes the LATA and MSCID parameters.

Figure 3A:
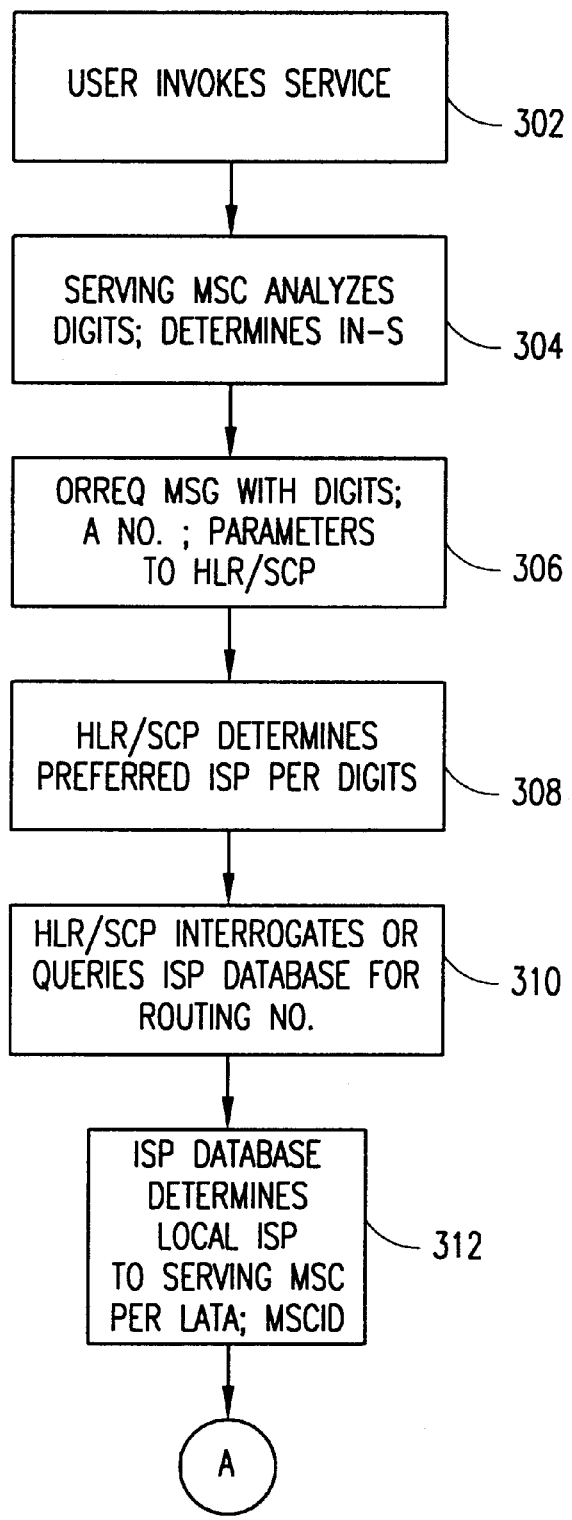
FIGS. 3A and 3B depict a flow diagram of an exemplary method of providing Internet access to a visiting mobile subscriber in a radio telecommunications network.
Figure 3B:
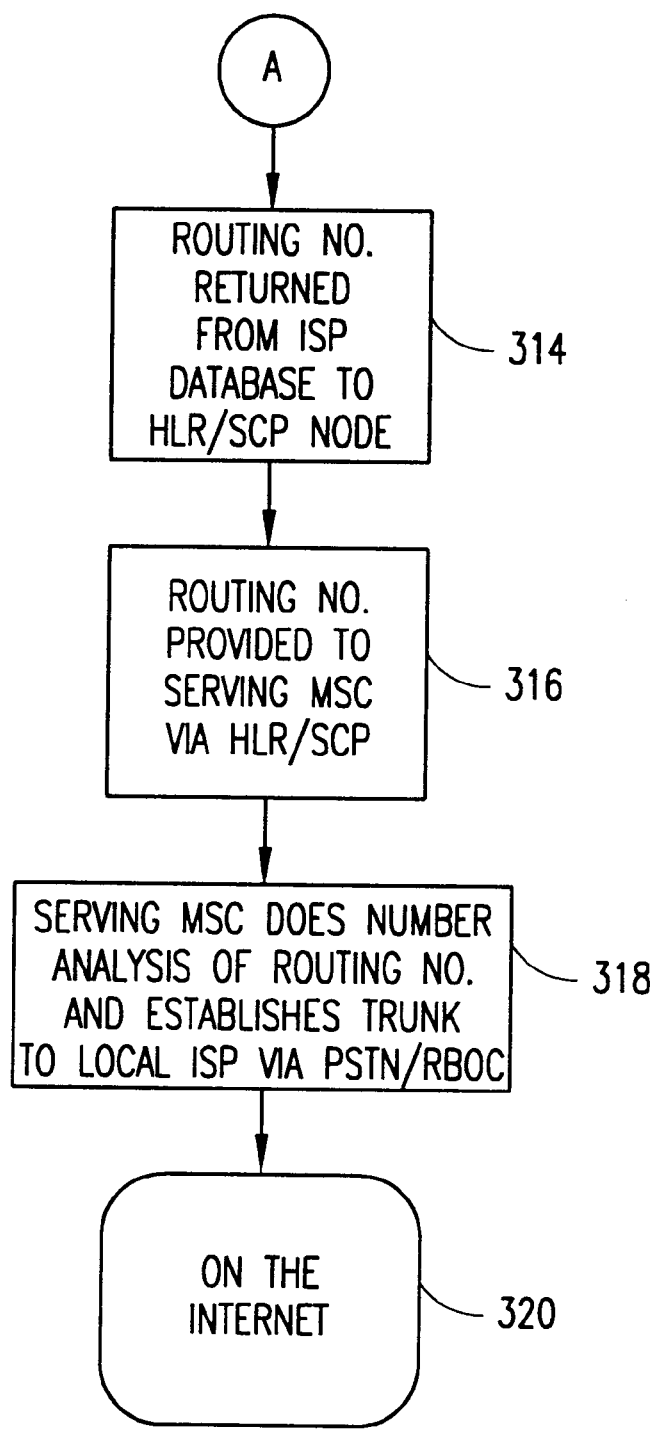

Continuing to refer to FIG. 2, in conjunction with FIGS. 3A and 3B, the ISP database 110 determines a routing number for a local ISP server's call path with respect to the location of the serving MSC 106, preferably on the basis of the received LATA and MSCID information (step 312). This routing number is then transmitted via the return message (inq) 206 to the home service node 108 (step 314), which in turn propagates the routing number to the serving MSC 106 via the return message (orreq) 208 (step 316). Upon receiving the routing number, the serving MSC 106 performs a number analysis on the routing number so that a data call trunk (segments 210 and 212) may be established to the local ISP location 118 via the PSTN 116 (step 318). Once the trunk is established, client software available to the mobile subscriber ("browser" software) is engaged in an Internet Protocol (IP) communication session with the local ISP server. The mobile subscriber is, accordingly, "on the Internet" (step 320) and can access a variety of Internet-based services, et cetera, after proper authentication and so on.

Based upon the foregoing, it should now be apparent to those of ordinary skill in the art that the present invention provides a solution which advantageously furnishes Internet access for roaming mobile subscribers without the deficiencies and shortcomings of the existing solutions described in the Background section of the present specification. Although the system and method of the present invention have been described in particular reference to certain radio telecommunications standards (for example, the ANSI-41 standard), it should be realized upon reference hereto that the innovative teachings contained herein are not necessarily limited thereto and may be implemented advantageously with any applicable radio telecommunications standard.

Further, it is believed that the operation and construction of the present invention will be apparent from the foregoing description. While the method and system shown and described have been characterized as being preferred, it will be readily apparent that various changes and modifications could be made therein without departing from the scope of the present invention. For example, although an arrangement including a laptop computer with a mobile phone has been described as an exemplary Internet access device in accordance with the teachings contained herein, it should be understood that any device capable of accessing the Internet using a wireless telecommunications network may be used for practicing the present invention. Accordingly, devices such as desktops, palmtops, Personal Digital Assistants, thin clients, web TV devices, network computers, portable computers, et cetera, all having wireless connectivity, may be used in accordance herewith.

In addition, as a further enhancement, the ISP entity selected by the mobile subscriber may preferably support Internet Protocol (IP) tunneling for establishing a virtual connection between the client (that is, the browsing software used by the roaming mobile subscriber) and an ISP server. Also, if a "long distance" routing number is returned from the ISP routing number database, a pre-selected default ISP server location may be provided to the mobile subscriber. Alternatively, an announcement or a dialog session may be made available to the subscriber so that it can choose other options or set different preferences. Moreover, additional IP-based services may be included by packaging suitable suffixes with the service invocation digits stream.

Accordingly, based on the foregoing, it should be readily appreciated by those skilled in the art that all such modifications, enhancements, additions, rearrangements, et cetera, are deemed to be within the scope of the present invention which is defined solely by the following claims.

What is claimed is:

1. A method of providing Internet access to a mobile subscriber operating a mobile station in a visited service area served by a serving Mobile Switching Center (MSC) disposed in a radio telecommunications network, said network including a home service node having a Home Location Register (HLR) and a Service Control Point (SCP), comprising the steps of:

storing in the home service node, a subscriber service category associated with the mobile station for identifying an Internet Service Provider (ISP);

storing at least one routing number for the identified ISP in an ISP database;

determining in the serving MSC that the mobile station has initiated an Internet access service;

sending a message from the serving MSC to the home service node to invoke the Internet access service, the message including a service trigger for the mobile subscriber, a plurality of digits dialed and a location information portion relating to at least one of the mobile station and the serving MSC's location;

determining, in the home service node, the identity of the ISP for the mobile subscriber based on the message;

interrogating, by the home service node, the ISP database associated with the ISP to determine a routing number for an ISP server location that is local to the serving MSC; and returning the routing number to the serving MSC for establishing a trunk connection to the ISP server location.

2. The method as set forth in claim 1, wherein the ISP is subscriber-selectable.

3. The method as set forth in claim 1, wherein the location information portion relating to the serving MSC's location comprises a switch identity parameter associated with the serving MSC.

4. The method as set forth in claim 1, wherein the location information portion relating to the mobile station's location comprises an area code parameter associated with a region served by the serving MSC.

5. The method as set forth in claim 1, wherein the service trigger comprises the mobile subscriber's telephone number.

6. The method as set forth in claim 1, wherein the mobile subscriber initiates the Internet access service by using a computing device having a wireless interface.

7. The method as set forth in claim 6, wherein the wireless interface comprises a digital mobile phone.

8. The method as set forth in claim 6, wherein the wireless interface comprises an analog wireless modem.

9. An Internet access system disposed in a radio telecommunications network, for providing Internet access to a roaming mobile subscriber located in a visited service area served by a serving Mobile Switching Center (MSC), comprising:

access means available to the roaming mobile subscriber for initiating an Internet access service;

a home service node including a Home Location Register (HLR) and an associated Service Control Point (SCP), wherein the HLR stores a subscriber service category for identifying an Internet Service Provider (ISP) preferred by the roaming mobile subscriber; and an ISP database coupled to the home service node, wherein, when the serving MSC sends a message to the home service node responsive to an actuation of the access means by the roaming mobile subscriber, the home service node determines the identity of the preferred ISP based on the message and interrogates the ISP database for a routing number associated with an ISP server, the routing number being returned to the serving MSC for establishing a trunk connection to the ISP server.

10. The system set forth in claim 9, wherein the access means comprises a computing device with a wireless interface.

11. The system set forth in claim 10, wherein the wireless interface comprises a digital mobile phone.

12. The system set forth in claim 10, wherein the wireless interface comprises a wireless modem.

13. The system set forth in claim 9, wherein the message includes a service trigger for the roaming mobile subscriber, a plurality of digits dialed in response to the actuation of the access means, and a parameter indicating at least one of the mobile subscriber's location and the serving MSC's location.

14. The system as set forth in claim 13, wherein the returned routing number is associated with the ISP server that is local to the mobile subscriber's location based upon the parameter.

15. The system as set forth in claim 14, wherein the parameter comprises an area code value associated with the mobile subscriber's location served by the serving MSC.

16. The system as set forth in claim 15, further including a unique switch identity (MSCID) value associated with the serving MSC.

\* \* \* \* \*